United States Patent
Morimoto

(10) Patent No.: US 8,212,389 B2
(45) Date of Patent: Jul. 3, 2012

(54) RELAY DRIVING CIRCUIT AND BATTERY PACK USING SAME

(75) Inventor: Naohisa Morimoto, Osaka (JP)

(73) Assignee: Panasonic Corporation, Osaka (JP)

( * ) Notice: Subject to any disclaimer, the term of this patent is extended or adjusted under 35 U.S.C. 154(b) by 279 days.

(21) Appl. No.: 12/599,899

(22) PCT Filed: Apr. 10, 2008

(86) PCT No.: PCT/JP2008/000934
§ 371 (c)(1), (2), (4) Date: Nov. 12, 2009

(87) PCT Pub. No.: WO2008/142824
PCT Pub. Date: Nov. 27, 2008

(65) Prior Publication Data
US 2011/0019328 A1  Jan. 27, 2011

(30) Foreign Application Priority Data
May 18, 2007  (JP) ................. 2007-132733

(51) Int. Cl.
*H02J 1/00* (2006.01)
(52) U.S. Cl. ............ 307/30; 307/25; 307/125; 307/130; 307/150; 361/154; 361/155; 361/156; 361/160
(58) Field of Classification Search .............. 307/30, 307/125, 130, 150; 361/154–156, 160
See application file for complete search history.

(56) References Cited

U.S. PATENT DOCUMENTS

| | | | | |
|---|---|---|---|---|
| 5,568,349 A * | 10/1996 | Kowalewski | ................. | 361/154 |
| 5,940,262 A * | 8/1999 | Archer | ................. | 361/155 |
| 5,994,929 A * | 11/1999 | Sano et al. | ................. | 327/111 |
| 6,236,552 B1 * | 5/2001 | Hattori | ................. | 361/160 |
| 6,900,973 B2 * | 5/2005 | Tojo et al. | ................. | 361/139 |
| 2006/0139839 A1 * | 6/2006 | Sato et al. | ................. | 361/140 |

(Continued)

FOREIGN PATENT DOCUMENTS
EP  0 807 948 A2  11/1997
(Continued)

OTHER PUBLICATIONS

Extended European Search Report issued in European Paten Application No. 08751552.4, dated Sep. 2, 2011.

*Primary Examiner* — Jared Fureman
*Assistant Examiner* — Alfonso Perez Borroto
(74) *Attorney, Agent, or Firm* — McDermott Will & Emery LLP

(57) ABSTRACT

A capacitor 16 is charged by turning on a switching element 12, and when a relay 18 is operated, by turning off the switching element 12 and turning on a switching element 13, a constant-voltage power supply 11 and the capacitor 16 are series-connected, and a switching element 14 is turned on to cause the series circuit of the constant-voltage power supply 11 and the capacitor 16 to be connected to a relay coil 20, so that the voltage resulting from addition of the output voltage of the constant-voltage power supply 11 and the charging voltage of the capacitor 16 is supplied to the relay coil 20, whereby causing the relay 18 to be turned on, after which the capacitor 16 is gradually discharged by means of the relay coil 20.

8 Claims, 6 Drawing Sheets

U.S. PATENT DOCUMENTS

| | | |
|---|---|---|
| 2006/0256497 A1* | 11/2006 | Sugimura et al. ............. 361/160 |
| 2007/0146959 A1* | 6/2007 | Morita ........................ 361/160 |
| 2007/0230084 A1* | 10/2007 | Telefont ....................... 361/160 |

FOREIGN PATENT DOCUMENTS

| | | |
|---|---|---|
| JP | 59-007547 | 1/1984 |
| JP | 60-175333 | 9/1985 |
| JP | 02-100222 A | 4/1990 |
| JP | 10-255627 | 9/1998 |
| JP | 11-288650 A | 10/1999 |
| JP | 2000-113787 | 4/2000 |
| JP | 2005-038656 | 2/2005 |
| JP | 2005-268134 | 9/2005 |
| JP | 2006-114446 | 4/2006 |
| JP | 2007-294226 | 11/2007 |

* cited by examiner

RELAY DRIVING CIRCUIT AND BATTERY PACK USING SAME

RELATED APPLICATIONS

This application is the U.S. National Phase under 35 U.S.C. §371 of International Application No. PCT/JP2008/000934, filed on Apr. 10, 2008, which in turn claims the benefit of Japanese Application No. 2007-132733, filed on May 18, 2007, the disclosures of which Applications are incorporated by reference herein.

TECHNICAL FIELD

This invention relates to a relay driving circuit which drives a relay, and to a battery pack which uses such a circuit.

BACKGROUND ART

Circuits which drive relays are generally circuits which maintain a contact by applying a constant voltage to a relay coil by means of a constant-voltage power supply.

However, when a relay is driven under constant voltage, the following problem is known to arise. Normally a relay contact is held closed by the magnetomotive force arising in the relay coil within the relay due to current flowing in the relay coil. This magnetomotive force is determined by the current flowing in the relay coil and by the number of coil turns. On the other hand, the relay coil generates heat due to losses which are the product of the resistance and the flowing current. Due to this heat generation the coil resistance increases, the current flowing in the coil decreases, and the magnetomotive force declines; and so a constant voltage sufficient to obtain the magnetomotive force necessary to hold the contact closed even after the increase in coil resistance is applied to the relay coil as the driving voltage.

Moreover, heat generation by the relay coil has a large effect not only on the relay lifetime, but also on peripheral equipment, and suppression of heat generation is an important factor of relay control. However, due to the counter-electromotive force in the relay coil occurring due to the sharp increase in coil current immediately after the driving voltage is applied to operate the relay, the magnetomotive force is reduced, and so the driving voltage must be increased in order to compensate for the coil counter-electromotive force. Hence it is desirable that during relay operation, the relay driving voltage be increased to cause the relay to operate reliably, and that after the relay is in the operating state and has stabilized, that the minimum driving voltage necessary to hold the contact closed by applied, in order to suppress heat generation by the relay.

As technology to reduce the driving current and suppress heat generation while causing a relay to operate reliably, technology to provide one constant-voltage power supply and to limit the current flowing in the coil by means of a series resistor after applying the output voltage of the constant-voltage power supply to the coil (see for example Patent Documents 1 and 2), and technology to lower the driving voltage by dividing the voltage applied to the coil using a Zener diode connected in series with the coil (see for example Patent Document 3), are known. And, technology to comprise a constant-voltage power supply which outputs a high voltage for initiation of relay operation and a constant-voltage power supply which outputs a low voltage to maintain the relay contact in the operating state, and to selectively switch the constant-voltage power supplies at the time of initiation of relay operation and after initiation of operation (see for example Patent Document 4), as well as technology to reduce coil losses by executing on/off control of the driving voltage in pulse form (see for example Patent Document 5), and similar are known.

In this Specification, in conformance with the definition of terms in JIS (Japan Industrial Standards) C4530-1996, relay "operation" indicates a transition of the relay from the reset state to the set state, "reset" indicates a transition of the relay from the set state to the reset state, "set state" indicates a state in which all form b contacts are open, all form a contacts are closed, and the relay is mechanically stable, and "reset state" indicates a state in which all form a contacts are open, all form b contacts are closed, and the relay is mechanically stable.

However, in the case of the technology of Patent Documents 1 and 2, because of the resistor connected in series with the relay coil, a loss occurs due to the product of the coil driving current and the resistance of the resistor, and in the case of the technology of Patent Document 3, because of the Zener diode connected in series with the relay coil, a loss occurs due to the product of the coil driving current and the Zener voltage of the Zener diode, so that there are the problems of increases in energy losses and heat generation. And in the case of the technology of Patent Document 4, because two constant-voltage power supplies are necessary, there is the problem that the circuit scale is increased. And in the case of the technology of Patent Document 5, there is the problem of the occurrence of radiation noise upon on/off control of the relay driving voltage.

Patent Document 1: Japanese Patent Application Laid-open No. H10-255627
Patent Document 2: Japanese Patent Application Laid-open No. 2005-268134
Patent Document 3: Japanese Patent Application Laid-open No. 2000-113787
Patent Document 4: Japanese Patent Application Laid-open No. 2005-38656
Patent Document 5: Japanese Patent Application Laid-open No. 2006-114446

DISCLOSURE OF THE INVENTION

An object of this invention is to provide, by means of a simple circuit, a relay driving circuit which can reduce the relay driving current and reduce relay heat generation, while improving the reliability of relay operation at the time of initiation of operation, as well as a battery pack using such a relay driving circuit.

A relay driving circuit according to one mode of the invention comprises a relay; first and second terminals which are connected to a power supply; a capacitor; a switching portion, which switches between a coil of the relay, the capacitor, and the first terminal; and a control portion, which causes the capacitor to be charged by connecting the first terminal and the capacitor by means of the switching portion, and when the relay is operated, causes the first terminal and the capacitor to be connected by means of the switching portion so that the power supply and the capacitor are series-connected, and in addition causes the series circuit of the power supply and the capacitor to be connected to the coil of the relay so that voltage resulting from addition of power supply output voltage and charging voltage of the capacitor is supplied to the coil of the relay.

Further, a battery pack according to one mode of the invention comprises any of the relay driving circuits described above, and a battery connected in series to an open/close portion of the relay.

In the relay driving circuit and battery pack configured as described above, the capacitor is charged by connecting the first terminal connected to the power supply and the capacitor, by means of the switching portion. And, by connecting the first terminal and the capacitor such that the power supply and the capacitor are series-connected and moreover connecting the series circuit of the power supply and capacitor with the coil of the relay by means of the switching portion, the voltage resulting from addition of the power supply output voltage and the charging voltage of the capacitor is supplied to the coil of the relay, and the relay is operated.

At the time of initiation of relay operation, the voltage applied to the relay coil increases, so that the reliability of relay operation at the time of initiation of operation can be improved. And, when the voltage resulting from addition of the power supply output voltage and the charging voltage of the capacitor is supplied to the coil of the relay, as the capacitor is gradually discharged due to the relay coil, the voltage applied to the relay coil declines, and consequently the relay driving current decreases, and heat generation decreases. In this case, there is no need to comprise two constant-voltage power supplies with different output voltages, as in the prior art, so that the circuit can be simplified.

Further, in a battery pack with such a configuration, the reliability when operating the relay to open and close the battery pack output current can be improved while reducing heat generation of the relay driving circuit, and heat generation to the battery due to the relay driving circuit can be reduced, so that consequently concerns of accelerated battery degradation due to heat generation of the relay driving circuit are alleviated.

BEST MODE FOR CARRYING OUT THE INVENTION

Below, aspects of the invention are explained based on the drawings. Portions to which the same symbol is assigned the drawings are the same, and redundant explanations thereof are omitted.

Figure 1:
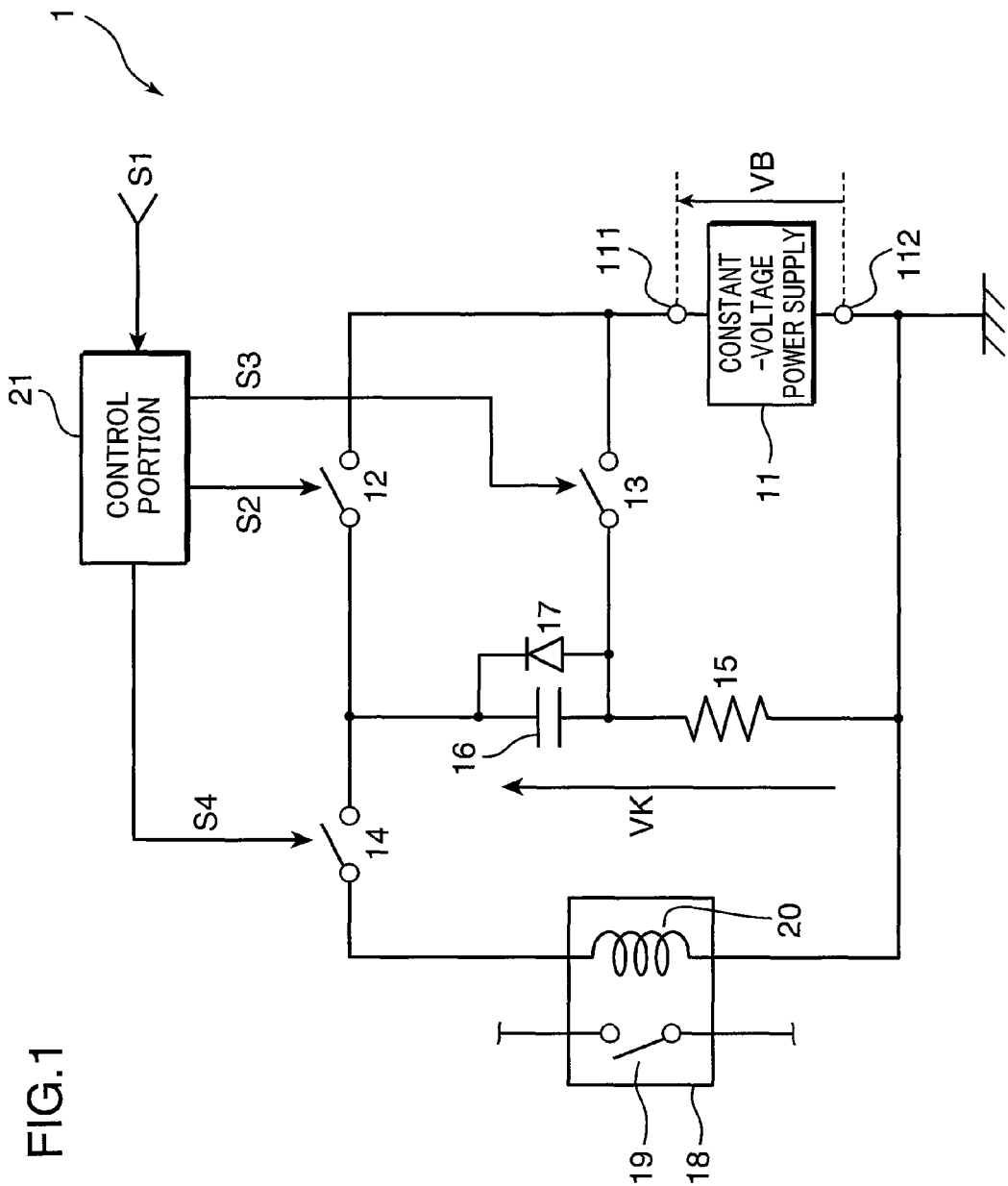
FIG. 1 is a circuit diagram showing an example of the configuration of the relay driving circuit of a first aspect of the invention.

(First Aspect)
FIG. 1 shows an example of the configuration of the relay driving circuit of a first aspect of the invention. The relay driving circuit 1 shown in FIG. 1 comprises a constant-voltage power supply 11, terminal 111 (first terminal), terminal 112 (second terminal), switching element 12 (first switch portion), switching element 13 (second switch portion), switching element 14 (third switch portion), resistor 15, capacitor 16, diode 17, relay 18, and control portion 21.

The relay 18 comprises a relay contact 19 and a relay coil 20, and is for example to turn on and off the driving current for the load of a vehicle (for example, a driving motor or similar), or to open and close various current supply circuits. The switching elements 12, 13, 14 are for example transistors or other switching elements. And, the relay driving circuit 1 shown in FIG. 1 operates the relay 18 according to a control signal S1 instructing the opening or closing of the relay 18.

The constant-voltage power supply 11 has its positive electrode connected to the terminal 111 and its negative electrode connected to the terminal 112, and outputs a voltage VB across the terminals 111 and 112. The terminal 112 is the circuit ground. The voltage VB is the operating voltage of the relay 18, that is, equal to or greater than the lowest voltage at which the relay 18 operates, and is set to as low a voltage as possible, such as for example 5 V. The terminals 111 and 112 may be, in addition to a terminal base or connectors, for example lands, pads, or other wiring pattern portions. The relay driving circuit 1 may also be configured without comprising a constant-voltage power supply 11, so as to receive the voltage VB from an external power supply connected to the terminals 111 and 112.

And, the terminal 111 is connected via the switching element 12 to one end of the capacitor 16, and via the switching element 13 to the other end of the capacitor 16. The connection point of the switching element 12 and the capacitor 16 is connected via the switching element 14 to one end of the relay coil 20, and the other end of the relay coil 20 is connected to the terminal 112. The diode 17 is connected in parallel and in reverse to the capacitor 16. The other end of the capacitor 16 is connected via the resistor 15 to the terminal 112. In this case, the switching elements 12, 13, 14 and resistor 15 are equivalent to one example of a switching portion.

The control portion 21 is a control circuit configured, for example, using a delay circuit and an inverter circuit or similar, and outputs control signals S2, S3, S4 to execute on (close) and off (open) control of the switching elements 12, 13, 14 according to the control signals S1. The control portion 21 may for example be configured using a microcomputer, or may be configured using other sequential circuits, logic circuits, or similar.

Figure 2:
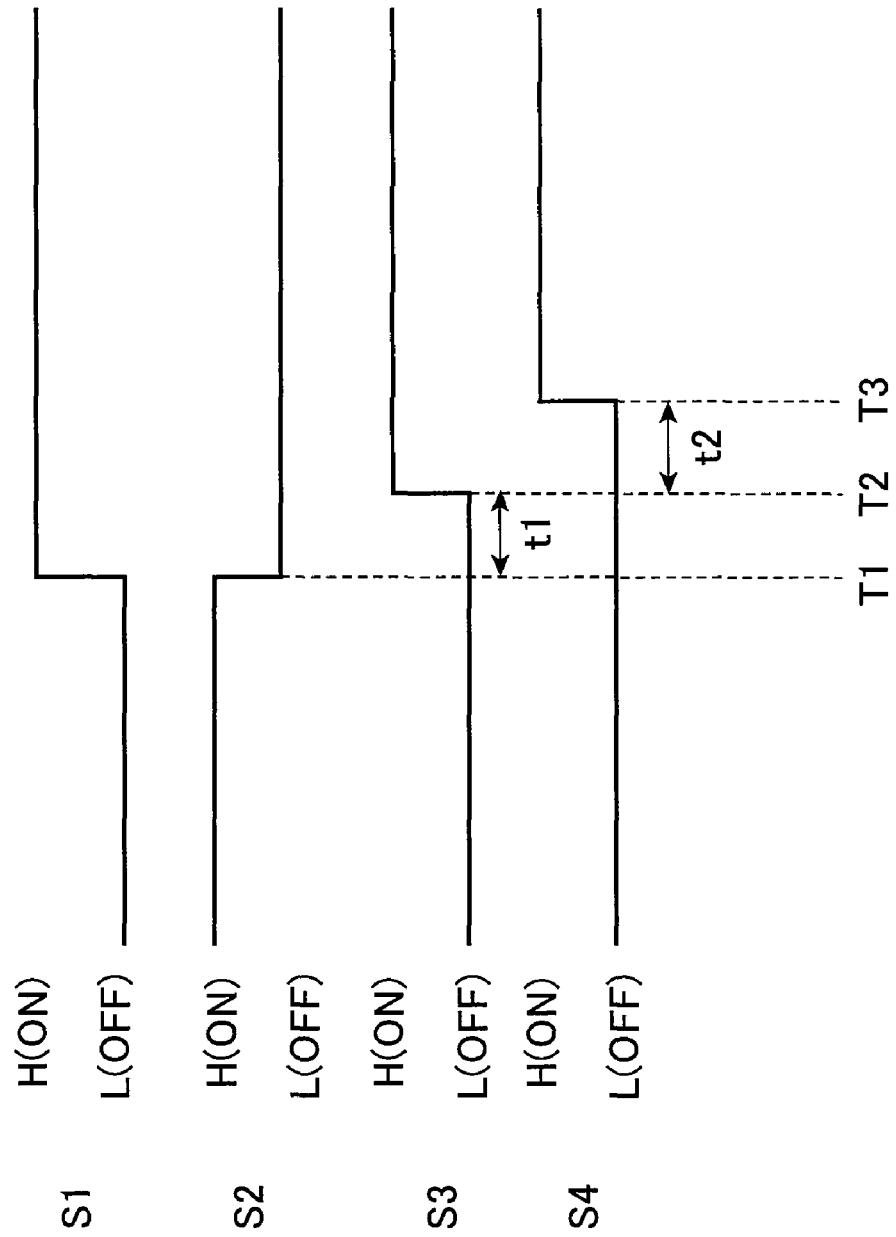
FIG. 2 is a signal waveform diagram, used to explain operation of the relay driving circuit shown in FIG. 1.

Next, operation of the relay driving circuit 1 configured as described above is explained. FIG. 2 is a signal waveform diagram used to explain operation of the relay driving circuit 1 shown in FIG. 1. A control signal S1 input from outside is for example at low level and instructs that the relay 18 be turned off, or is at high level and instructs that the relay 18 be turned on. And, the control signals S2, S3, S4 turn off the switching elements 12, 13, 14 at low level, for example, and turn the switching elements 12, 13, 14 on at high level.

The control portion 21 uses an inverter circuit, for example, to invert the control signal S1 and generate the control signal S2, uses a delay circuit to delay the control signal 51 by a delay time t1 to generate the control signal S3, and uses a delay circuit to delay the control signal S3 by a delay time t2 to generate the control signal S4.

In the relay driving circuit 1 configured in this way, when the control signal S1 is input at low level from outside so as to turn off the relay 18, the control portion 21 makes the control signal S2 high level and makes the control signals S3 and S4 low level, so that the switching element 12 is turned on and the switching elements 13 and 14 are turned off. Then, a closed circuit is formed by the constant-voltage power supply 11, switching element 12, capacitor 16, and resistor 15, the output voltage VB of the constant-voltage power supply 11 is applied to the series circuit of the capacitor 16 and resistor 15, and the capacitor 16 is charged. At this time, the switching element 14 is turned off, to prevent the voltage VB from being applied to the relay coil 20 and causing the relay 18 to turn on.

Then, when the resistance of the switching element 12 and the internal resistance of the constant-voltage power supply 11 are sufficiently low compared with the resistance of the resistor 15, the charging voltage VC1 of the capacitor 16 is as given by equation (1) below.

$$VC1 = VB \times (1-e^{-\alpha}) \qquad (1)$$

Here $\alpha = t/(R_{15} \times C_{16})$, where $C_{16}$ is the electrostatic capacitance of the capacitor 16, $R_{15}$ is the resistance of the resistor 15, VB is the output voltage of the constant-voltage power supply 11, and t is the charging time of the capacitor 16.

Hence the charging voltage (voltage across the terminals) VC1 of the capacitor 16 rises with the passage of the charging time according to equation (1), and stabilizes at the voltage VB.

After the capacitor 16 has been charged to the voltage VB in this way, when the control signal S1 is input at high level from outside so as to turn on the relay 18, the control portion 21 makes the control signal S2 low level, and the switching element 12 is turned off (at time T1). Then, the charging voltage VC of the capacitor 16 is maintained at the voltage VB.

And, after the delay time t1, set in advance, has elapsed from the time T1, the control portion 21 makes the control signal S3 high level, and the switching element 13 is turned on (at time T2). The delay time t1 is for example set to a time which is approximately the operation delay time for the switching element 12 from the time the control signal S2 falls until the switching element 12 turns off. When the switching element 13 is turned on, the constant-voltage power supply 11 and the capacitor 16 are connected in series. Then, the voltage VK on the side of the switching element 14 of the capacitor 16 is as given by equation (2) below.

$$VK = VC1 + VB \qquad (2)$$

Here, if the control portion 21 were to turn on the switching element 13 simultaneously with the turning-off of the switching element 12, there would be the concern that the capacitor 16 might be short-circuited and discharged instantaneously during the process in which the switching element 12 transitions from on to off and the switching element 13 transitions from off to on. However, as shown in FIG. 2, a delay time t1 is provided between the falling of the control signal S2 (at time T1) and the rising of the control signal S3 (at time T2), and as a result of turning on the switching element 13 after the switching element 12 has been completely turned off, concerns about discharge of the capacitor 16 are alleviated.

And, the control portion 21 makes the control signal S4 high level after a delay time t2, set in advance, has elapsed from the time T2, and the switching element 14 is turned on (at time T3). The delay time t2 is for example set to a time which is approximately the operation delay time of the switching element 13 from the time the control signal S3 rises until the switching element 13 turns on.

At time T3, when the switching element 14 turns on, the voltage VK=VC1+VB given by equation (2) is applied to the relay coil 20 of the relay 18. Then, because the charging voltage VC1 of the capacitor 16 is maintained at voltage VB as explained above, a voltage VB×2 (for example, 10 V) is applied to the relay coil 20, and the relay contact 19 is turned on. By this means, the voltage applied to the relay coil 20 at the time of initiation of operation of the relay 18 increases, so that the reliability of operation of the relay 18 can be improved.

At this time, an LC series circuit is formed by the relay coil 20 and the capacitor 16, and there are concerns that transient oscillation may occur; but by causing current flowing due to the counter-electromotive force of the relay coil 20 to bypass the capacitor 16 by means of the diode 17, such oscillations are suppressed.

After time T3 at which the switching element 14 turns on, that is, after operation of the relay 18, the charging voltage VC2 of the capacitor 16 is given by equation (3), when the resistance values of the switching elements 12 and 14 are sufficiently low compared with the resistance value RL of the relay coil 20.

$$VC2 = VC1 \times e^{-\beta} \qquad (3)$$

Here $\beta = t/(RL \times C_{16})$, where RL is the resistance of the relay coil 20.

And, after operation of the relay 18, the voltage VK applied to the relay coil 20 is as given by equation (4) below.

$$VK = VC2 + VB \qquad (4)$$

As indicated in equation (3), after operation of the relay 18, the charging voltage VC2 of the capacitor 16 declines with the passage of time t, and when sufficient time has elapsed for the relay 18 to reliably transition to the set state and stabilize, the right side of equation (3), that is, the charging voltage VC2, is zero, so that in equation (4) the voltage VK applied to the relay coil 20 is the voltage VB. The electrostatic capacitance $C_{16}$ of the capacitor 16 is set appropriately such that, in equation (3), the voltage VK can be maintained at an increased state for a sufficient time for the relay 18 to reliably transition to the set state and stabilize.

When the relay 18 transitions to the set state and stabilizes, the voltage VK applied to the relay coil 20 is the voltage VB, that is, at least the minimum voltage necessary for operation of the relay 18, and so is reduced to an extremely low voltage (for example, 5 V), so that the driving current flowing to the relay coil 20 can be reduced while maintaining the set state of the relay 18, and heat generation and energy losses can be reduced.

The relay driving circuit 1 shown in FIG. 1 does not comprise a resistor for current limiting as in the technology of the prior art disclosed in Patent Documents 1 and 2, and does not comprise a Zener diode for voltage division as in the technology disclosed in Patent Document 3, so that energy losses and heat generation due to a resistance for current limiting or Zener diode are reduced, and it is easy to reduce energy losses and heat generation compared with the technologies disclosed in Patent Documents 1, 2 and 3.

For example, after the relay 18 is switched from on to off, it is sufficient for the resistor 15 to be such that the capacitor 16 can be charged before the next time the relay 18 is turned on, and so the resistance $R_{15}$ of the resistor 15 may be comparatively high. The higher the resistance $R_{15}$, the more the current consumption of the constant-voltage power supply 11 when the switching element 13 is turned on can be reduced. And, if the output voltage VB of the constant-voltage power supply 11 is 5 V, when the operation time has elapsed from the time the relay 18 is turned off until the time the relay 18 is turned on, if the voltage across the terminals of the capacitor 16 is not below the actuating voltage of the relay 18, the relay 18 can be reliably operated. Hence if the actuating time of the relay 18 is 50 msec, the actuating voltage is 9 V, and the coil resistance is 40Ω, then from the following equation (5), the electrostatic capacitance $C_{16}$ of the capacitor 16 is approximately 5600 μF.

$$9 V = 5 V \times e^{-\beta} \qquad (5)$$

Where $\beta=50\ \text{msec}\times e^{-3}/(40\Omega\times C_{16})$, $C_{16}\cong 5600\times e^{-6}$ Further, there is no need to comprise a plurality of constant-voltage power supplies as in the technology of the prior art disclosed in Patent Document 4, so that the circuit can be simplified. And, there is no need for pulse-shape on/off control of the relay driving voltage as in the technology of the prior art disclosed in Patent Document 5, so that the occurrence of radiation noise can be reduced.

As explained above, in the relay driving circuit 1 shown in FIG. 1, by securing a sufficient applied voltage at the time of initiation of relay operation, the reliability of operation of the relay 18 can be improved, and by subsequently reducing the voltage applied to the relay 18 accompanying discharge of the capacitor 16, the driving current can be reduced, and heat generation can be suppressed.

(Second Aspect)

Figure 3:
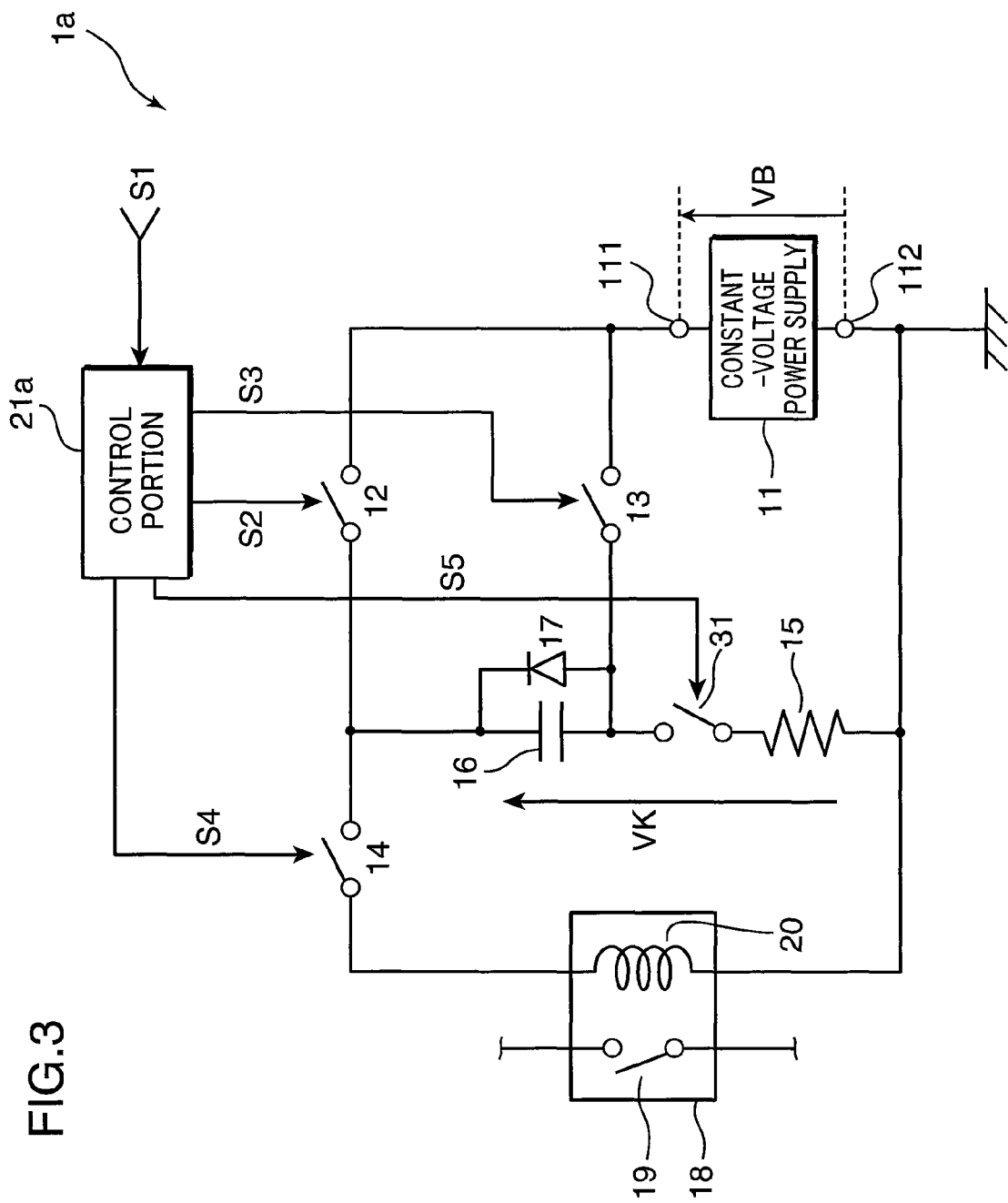
FIG. 3 is a circuit diagram showing an example of the configuration of the relay driving circuit of a second aspect of the invention.

Next, the relay driving circuit of a second aspect of the invention is explained. FIG. 3 is a circuit diagram showing an example of the configuration of the relay driving circuit 1a of the second aspect of the invention. The relay driving circuit 1a shown in FIG. 3 differs from the relay driving circuit 1 shown in FIG. 1 in the further provision of a switching element 31 (fourth switch portion) between the connection point of the capacitor 16, switching element 13 and anode of the diode 17, and the resistor 15, that is, in the current path from the capacitor 16 via the resistor 15 to the terminal 112. Also, the control portion 21a differs in causing the switching element 31 to be closed when the relay 18 is in the reset state and the capacitor 16 is charged by generating a control signal S5 by for example inverting the control signal S1, and in opening the switching element 31 when the relay 18 is in the set state.

The switching element 31 is for example a transistor or other switching element, and is turned on by for example the output of a high-level control signal S5 from the relay driving circuit 1a. The switching element 31 needs to be provided in the current path from the capacitor 16 via the resistor 15 to the terminal 112, and may for example be provided between the resistor 15 and the terminal 112.

Figure 4:
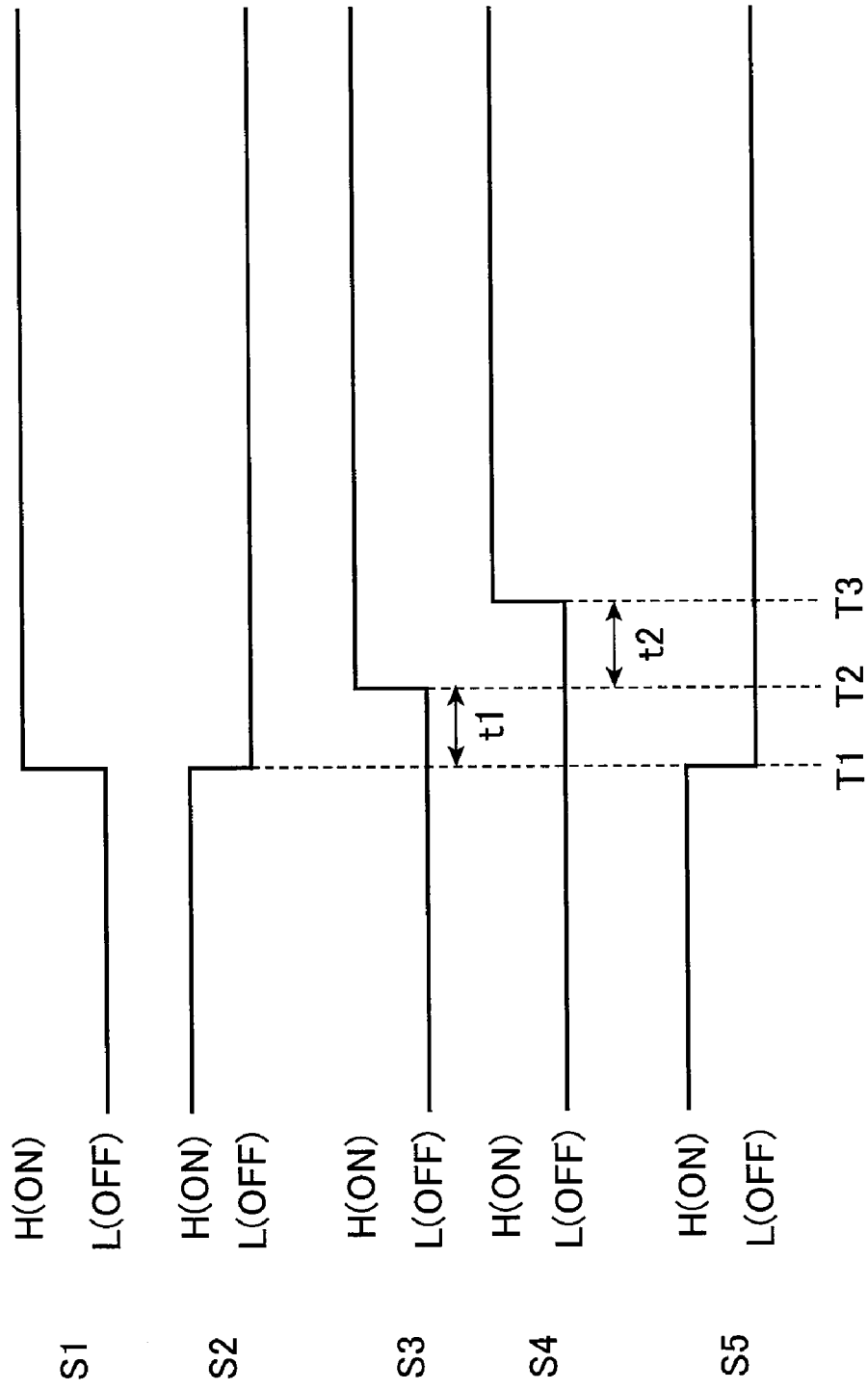
FIG. 4 is a signal waveform diagram, used to explain operation of the relay driving circuit shown in FIG. 3.

Otherwise the configuration is similar to that of the relay driving circuit 1 shown in FIG. 1, and an explanation is omitted; below, operation of the relay driving circuit 1a shown in FIG. 3 is explained. FIG. 4 is a signal waveform diagram used to explain operation of the relay driving circuit 1a shown in FIG. 3. In FIG. 4, changes in the control signals S1, S2, S3, S4 are similar to those of the relay driving circuit 1 shown in FIG. 1. And, the control portion 21a generates the control signal S5 by for example using an inverter circuit to invert the control signal S1 as shown in FIG. 4. The switching element 31 is for example turned off when the control signal S5 is at low level, and is turned on when the control signal S5 is at high level.

In a relay driving circuit 1a configured in this way, when a control signal S1 at low level is input from outside to turn off the relay 18, the control portion 21a makes the control signals S2 and S5 high level and makes the control signals S3 and S4 low level, so that the switching elements 12 and 31 are turned on and the switching elements 13 and 14 are turned off. Then, a closed circuit is formed by the constant-voltage power supply 11, switching element 12, capacitor 16, and resistor 15, and the capacitor 16 is charged.

When, after the capacitor 16 has been charged to the voltage VB, the control signal S1 is input at high level from outside to turn on the relay 18, the control portion 21 makes the control signal S2 low level and turns off the switching element 12, and makes the control signal S5 low level and turns off the switching element 31 (at time T1), and thereafter the operations at times T1 to T3 are performed similarly to the case of the relay driving circuit 1 shown in FIG. 1. In this case, the switching element 31 is turned off, and current from the constant-voltage power supply 11 passing through the terminal 111, switching elements 13 and 31, resistor 15, and terminal 112 to arrive at the constant-voltage power supply 11 can be shut off, so that power consumption of the relay driving circuit 1a can be reduced.

Normally bipolar transistors, field effect transistors, or other semiconductor devices are used as the switching elements 12, 13, 14, 31, and because the switching speed is sufficiently fast, t1 and t2 are sufficiently short, that is, turn-on and off is possible in approximately 10 msec.

Figure 5:
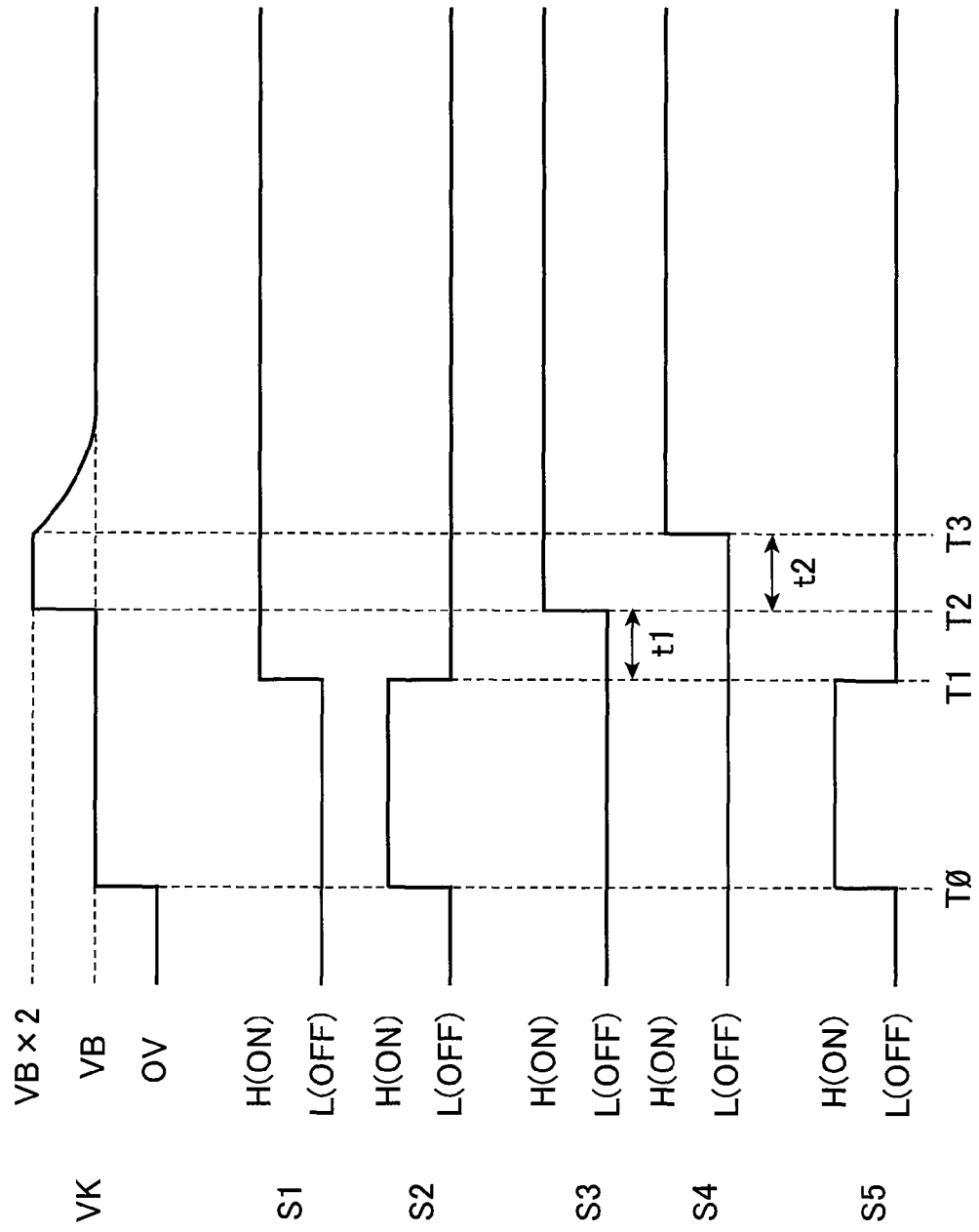
FIG. 5 is a signal waveform diagram, used to explain behavior of the voltage at the terminal on the high-potential side of the capacitor shown in FIG. 3; and, FIG. 6 is a circuit diagram showing an example of the configuration of the battery pack of a third aspect of the invention.

FIG. 5 is a signal waveform diagram used to explain the behavior of the voltage VK on the side of the switching element 14 of the capacitor 16 shown in FIG. 3. In the example shown in FIG. 5, before or at time T0, when for example the control portion 21a has not yet been started, control signals S2 to S5 are all made low level, and the switching elements 12, 13, 14, 31 are turned off. Then, the voltage VK is 0 V.

At time T0 the control portion 21a is started, the low-level control signal S1 is inverted by the control portion 21a, the control signals S2 and S5 are made high level, and the switching elements 12 and 31 are turned on. Then, the voltage VB output from the constant-voltage power supply 11 is applied to the series circuit of the resistor 15 and capacitor 16, the voltage Vk rises to the voltage VB, and the capacitor 16 is charged through the resistor 15. And, the charging voltage VC1 of the capacitor 16 rises until reaching the voltage VB, according to equation (1).

At time T1 the control signal S1 is changed to high level, the control portion 21a makes the control signals S2 and S5 low level and turns off the switching elements 12 and 31, and at time T2 the control signal S3 is made high level and the switching element 13 is turned on, whereupon the output voltage VB of the constant-voltage power supply 11 and the charging voltage VC1 of the capacitor 16 are added, and the voltage VK becomes twice the voltage VB.

Next, at time T3 the control portion 21a makes the control signal S4 high level and turns on the switching element 14. Then, the voltage VK, which has been maintained at twice the voltage VB, is applied to the relay coil 20 of the relay 18, and the relay contact 19 is turned on. By this means, the voltage applied to the relay coil 20 at the time of initiation of operation of the relay 18 is increased, so that the reliability of operation of the relay 18 can be improved.

After time T3 at which the switching element 14 is turned on, the voltage VK applied to the relay coil 20 declines with the passage of time t according to equations (3) and (4), and after a sufficient length of time has elapsed for the relay 18 to transition reliably to the set state and stabilize, the voltage VK applied on the relay coil 20 becomes the voltage VB.

By changing the voltage VK in this way, the driving current flowing to the relay coil 20 can be reduced, and heat generation and energy losses can be reduced, while maintaining the set state of the relay 18.

(Third Aspect)

Figure 6:
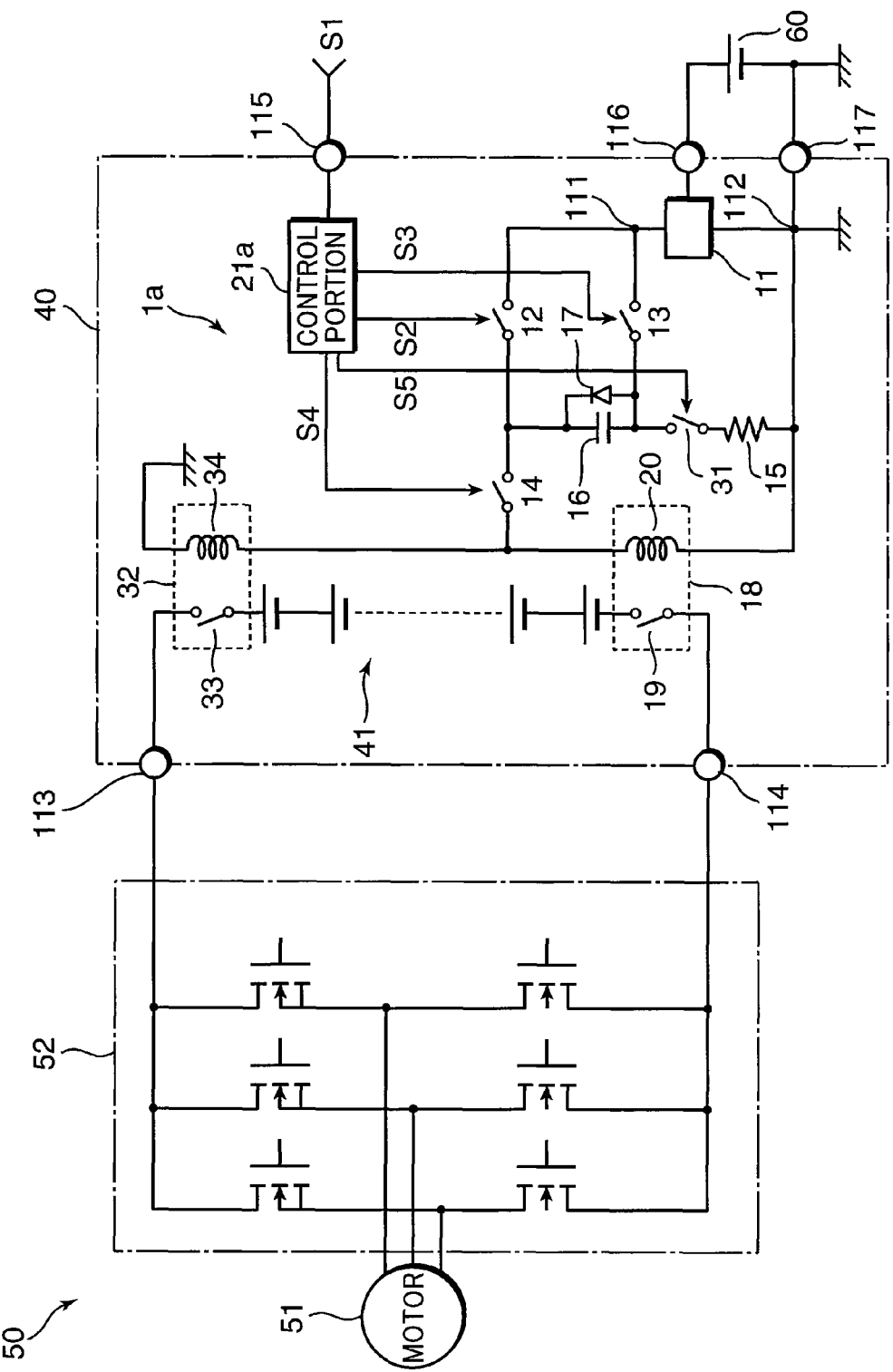

Next, the battery pack using a relay driving circuit of a third aspect of the invention is explained. FIG. 6 is a circuit diagram showing an example of the configuration of the battery pack 40 of the third aspect of the invention. The battery pack 40 shown in FIG. 6 comprises the relay driving circuit 1a shown in FIG. 3, a battery 41, a relay 32, and connection terminals 113, 114, 115, 116, 117.

The relay 32 comprises a relay contact 33 and relay coil 34. The relay coil 34 is connected in parallel with the relay coil 20 in the relay driving circuit 1a. And, the relay 32 is driven together with the relay 18 by the relay driving circuit 1a.

The battery 41 may be a single-cell battery, or a battery module in which single-cell batteries are connected in series, or may be batteries connected in parallel. And, the battery 41 may be a primary battery, or may be a secondary battery. The relay contact 33, battery 41, and relay contact 19 are connected in series in this order, and a so-called double-pole switch is formed by the relays 18 and 32.

The connection terminal 115 is connected to external equipment, such as for example the ECU (Electric Control Unit) of a vehicle or other circuitry, and receives control signals S1 from the ECU or similar. The connection terminals 116 and 117 are connection terminals to receive a power supply voltage for operation of the relay driving circuit 1a; the connection terminal 116 is connected to the positive pole in an external power supply 60, and the connection terminal 117 is connected to ground. The power supply 60 uses, for example, a 12 V battery mounted in the vehicle.

The constant-voltage power supply 11 is connected to the connection terminals 116 and 117, and converts the power supply voltage received by the connection terminals 116 and 117, for example 12 V, into the voltage VB, for example 5 V. The connection terminal 116 may be used in place of the terminal 111, without comprising a constant-voltage power supply 11, to supply the voltage VB from an external power supply to the connection terminals 116 and 117. In this case, the connection terminals 116 and 117 are equivalent to examples of first and second terminals. The constant-voltage power supply 11 may be configured so as to generate the voltage VB based on the output voltage of the battery 41, or, the battery 41 which outputs a voltage equivalent to the voltage VB, or a portion of the cells of the battery 41, may be used in place of the constant-voltage battery 11.

The connection terminals 113 and 114 are connection terminals used to connect the load 50. The connection terminal 113 is connected to the connection terminal 114 via the relay contact 33, battery 41, and relay contact 19. The load 50 shown in FIG. 6 comprises, for example, a motor 51 used in driving a vehicle, and an inverter circuit 52 which supplies a three-phase power supply voltage to the motor 51. The inverter circuit 52 is connected to the connection terminals 113, 114. By this means, when the control signal S1 received at the connection terminal 115 goes to high level, the relay driving circuit 1a turns on the relays 18 and 32, so that a DC power supply voltage is supplied from the battery 41 to the inverter circuit 52, and the inverter circuit 52 converts this to a three-phase power supply voltage and drives the motor 51.

In this case, as explained above, the reliability of operation of the relays 18 and 32 can be improved. Further, heat generation by the relays 18, 32 can be decreased while maintaining the set state of the relays 18, 32, and moreover, because heat generation in the relay driving circuit 1a can be reduced compared with the cases of the technology disclosed in Patent Documents 1 to 3, unwanted heat imparted to the battery 41 is reduced, and concerns about shortening of the battery lifetime due to heat generation by the relay driving circuit 1a are alleviated.

The relay driving circuit according to one mode of the invention comprises a relay; first and second terminals, connected to a power supply; a capacitor; a switching portion, which switches between the coil of the relay, the capacitor, and the first terminal; and a control portion, which causes the capacitor to be charged by connecting the first terminal and the capacitor by means of the switching portion, and when the relay is to be operated, causes the first terminal and the capacitor to be connected by means of the switching portion so that the power supply and the capacitor are series-connected, and in addition causes the series circuit with the capacitor to be connected to the coil of the relay, so that the voltage resulting from addition of the power supply output voltage and the charging voltage of the capacitor is supplied to the coil of the relay.

By means of this configuration, by having the switching portion connect the capacitor to the first terminal connected to the power supply, the capacitor is charged. And by having the switching portion connect the first terminal to the capacitor so that the power supply and capacitor are series-connected, and connecting the series circuit of the power supply and the capacitor to the relay coil, the voltage resulting from addition of the power supply output voltage and the charging voltage of the capacitor is supplied to the coil of the relay, and the relay is operated.

At the time of initiation of relay operation, the voltage applied to the relay coil increases, so that the reliability of relay operation at the time of initiation of operation can be improved. And, when the voltage resulting from addition of the power supply output voltage and the charging voltage of the capacitor is supplied to the coil of the relay, as the capacitor is gradually discharged due to the relay coil, the voltage applied to the relay coil declines, and consequently the relay driving current decreases, and heat generation decreases. In this case, there is no need to comprise two constant-voltage power supplies with different output voltages, as in the prior art, so that the circuit can be simplified.

It is preferable that the switching portion comprise a first switch portion, which opens and closes the circuit between the first terminal and one end of the capacitor, and a second switch portion, which opens and closes the circuit between the first terminal and the other end of the capacitor, and that the control portion close the first switch portion and open the second switch portion to cause the capacitor to be charged, and open the first switch portion and close the second switch portion to cause the first terminal and the capacitor to be connected such that the power supply and the capacitor are series-connected.

By means of this configuration, the capacitor is charged to the power supply voltage by causing the control portion to close the first switch portion and connect the first terminal and one end of the capacitor, and opening the second switch portion. And, by causing the control portion to open the first switch portion and close the second switch portion, the power supply and capacitor are series-connected, and the power supply output voltage and capacitor charging voltage are added, so that by means of a simple circuit using the first and second switch portions, the voltage applied to the relay coil can be increased.

Further, it is preferable that the switching portion comprise a third switch portion which opens and closes the circuit between one end of the capacitor and the relay coil, and that when the capacitor is being charged, the control portion causes the third switch portion to open, and when the relay is operated, causes the third switch portion to close.

By means of this configuration, when the capacitor is charged the third switch portion is opened and the connection between one end of the capacitor and the relay coil is disconnected, so that concerns that the charging voltage of the capacitor may be applied to the relay coil and cause the relay to be operated are alleviated. Further, when operating the relay, the third switch portion is closed and one end of the capacitor is connected to the relay coil, so that the voltage obtained by series-connecting the power supply and the capacitor, that is, the increased voltage obtained by adding the power supply output voltage to the capacitor charging voltage, can be applied to the relay coil to cause the relay to operate.

Further, it is preferable that the switching portion comprise a resistor which connected the other end of the capacitor to the second terminal.

By means of this configuration, by closing the first switch portion and opening the second switch portion a charging path is formed such that the capacitor is charged from the first and second terminals through the resistor, and the capacitor is charged. And, when the second switch portion is closed, the current flowing between the first and second terminals is limited by the resistance, so that concerns that the power supply connected between the first and second terminals may be short-circuited are alleviated.

Further, it is preferable that a fourth switch portion, which opens and closes the current path from the capacitor through the resistor to the second terminal, be comprised, and that the control portion cause the fourth switch to be closed when charging the capacitor and cause the fourth switch portion to be opened when operating the relay.

By means of this configuration, by causing the control portion to close the fourth switch portion when charging the capacitor a current path from the capacitor through the resistor to the second terminal is formed, and the capacitor can be charged through the resistor. And, as a result of causing the control portion to open the fourth switch portion when operating the relay in order to block current flowing through the resistor, current consumption in the relay driving circuit can be reduced.

Further, it is preferable that a diode be further comprised, with one end of the capacitor connected to the cathode and the other end of the capacitor connected to the anode.

By means of this configuration, the electromotive force occurring due to the relay coil bypasses the capacitor by means of the diode, so that oscillation of the LC series circuit comprising the relay coil and the capacitor is suppressed.

Further, a battery pack according to one mode of this invention comprises any one of the above-described relay driving circuits, and a battery connected in series with the relay open/close portion. By means of this configuration, reliability can be improved when operating the relay to open and close the circuit for the battery pack output current, while reducing heat generation by the relay driving circuit, and as a result of decreasing battery heating by the relay driving circuit, concerns of accelerated battery degradation due to heat generation by the relay driving circuit are alleviated.

Industrial Applicability

A relay driving circuit of this invention can reduce the relay driving current and suppress heat generation while improving the reliability of relay operation, so that application in various electrical equipment employing relays is possible, and in particular is preferable for use in equipment in which high reliability and low power consumption are sought. Further, a battery pack of this invention is preferable for use as a battery pack in portable personal computers, digital cameras, portable telephone sets and other electronic equipment, electrical vehicles, hybrid vehicles and other vehicles, as well as in other battery-driven equipment, and as a power supply for other such battery-driven equipment.

The invention claimed is:

1. A relay driving circuit, comprising:
a relay;
first and second terminals which are connected to a power supply;
a capacitor;
a switching portion, which switches between a coil of the relay, the capacitor, and the first terminal, and includes a first switch portion that opens and closes connection between the first terminal and one end of the capacitor and a second switch portion that opens and closes connection between the first terminal and the other end of the capacitor; and,
a control portion, which causes the capacitor to be charged by closing the first switch portion and opening the second switch portion, and when the relay is operated, causes the first terminal and the capacitor to be connected so that the power supply and the capacitor are series-connected by opening the first switch portion and closing the second switch portion, and in addition causes the series circuit of the power supply and the capacitor to be connected to the coil of the relay by means of the switching portion so that voltage resulting from addition of output voltage of the power supply and charging voltage of the capacitor is supplied to the coil of the relay.

2. The relay driving circuit according to claim 1, wherein:
the switching portion further comprises a third switch portion which opens and closes connection between one end of the capacitor and the coil of the relay, and
the control portion opens the third switch portion when causing the capacitor to be charged and closes the third switch portion when causing the relay to be operated.

3. The relay driving circuit according to claim 2, wherein:
the switching portion comprises a resistor which connects the other end of the capacitor to the second terminal.

4. The relay driving circuit according to claim 3, further comprising a fourth switch portion which opens and closes a current path from the capacitor, through the resistor, to the second terminal,
wherein the control portion closes the fourth switch portion when charging the capacitor, and opens the fourth switch portion when operating the relay.

5. The relay driving circuit according to claim 1, wherein:
the switching portion comprises a resistor which connects the other end of the capacitor to the second terminal.

6. The relay driving circuit according to claim 5, further comprising a fourth switch portion which opens and closes a current path from the capacitor, through the resistor, to the second terminal,
wherein the control portion closes the fourth switch portion when charging the capacitor, and opens the fourth switch portion when operating the relay.

7. The relay driving circuit according to claim 1, further comprising a diode, the cathode of which is connected to one end of the capacitor, and the anode of which is connected to the other end of the capacitor.

8. A battery pack, comprising:
the relay driving circuit according to claim 1, and
a battery connected in series with an open/close portion of the relay.

* * * * *